R. ABELL.
SPEEDOMETER.
APPLICATION FILED DEC. 13, 1909.
990,945.
Patented May 2, 1911.
2 SHEETS—SHEET 1.
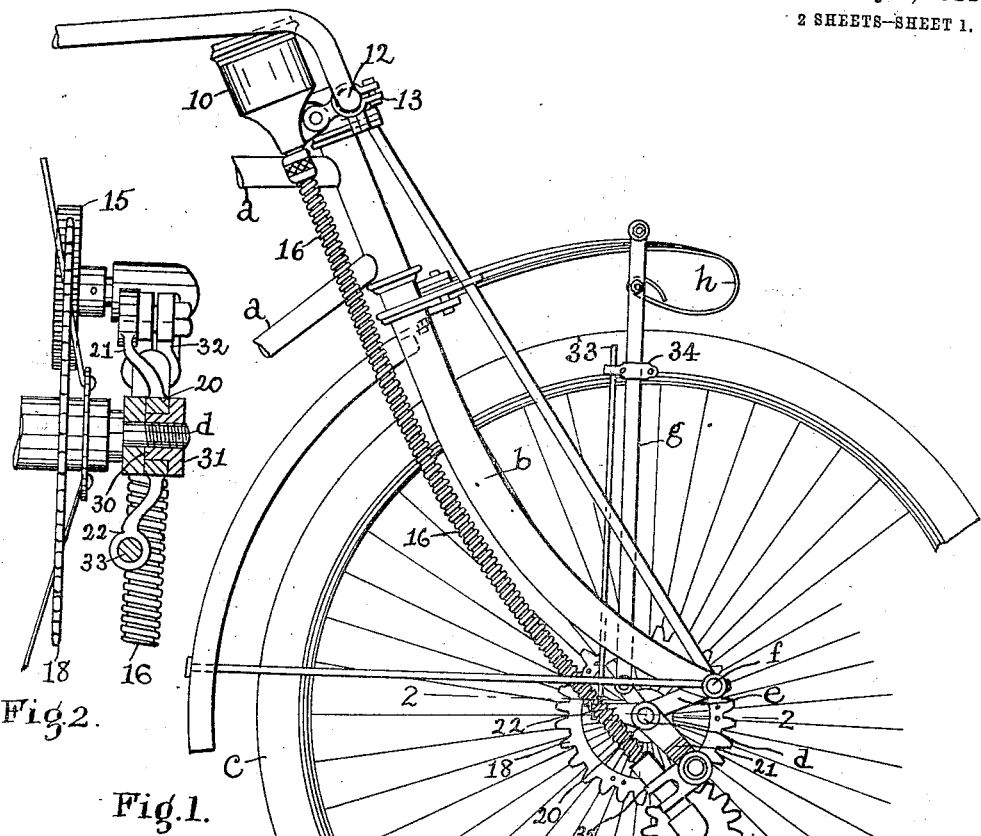
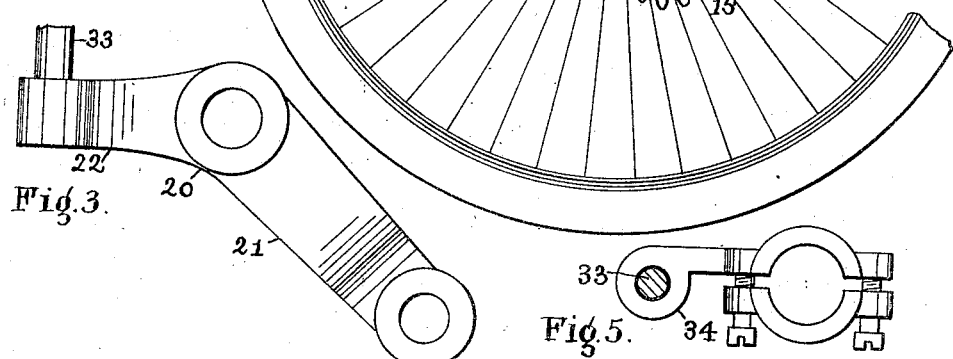
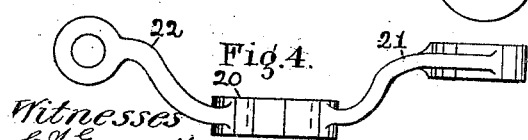
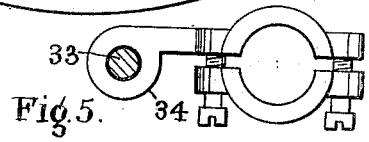
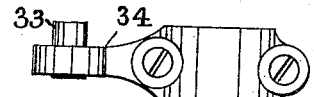
Witnesses
C. H. Garnett
J. Murphy
Inventor
Rollin Abell
by Jas. H. Churchill
atty.

UNITED STATES PATENT OFFICE.

ROLLIN ABELL, OF BOSTON, MASSACHUSETTS.

SPEEDOMETER.

990,945.  Specification of Letters Patent.  Patented May 2, 1911.

Application filed December 13, 1909. Serial No. 532,835.

*To all whom it may concern:*

Be it known that I, ROLLIN ABELL, a citizen of the United States, residing in Boston, county of Suffolk, and State of Massachusetts, have invented an Improvement in Speedometers, of which the following description, in connection with the accompanying drawings, is a specification, like letters on the drawings representing like parts.

This invention relates to motor cycles of that class commonly known as spring forked motor cycles, in which the front fork of the machine is connected with a support, which is pivotally mounted on the axle of the front wheel.

The present invention has for its object to provide motor cycles of the class referred to with a speedometer, which is operatively connected with and driven from the front wheel of the motor cycle and the driving mechanism of which is supported, so that the accuracy of the speedometer is not interfered with by movement of the spring fork or vibration of the machine. For this purpose, the axle of the front wheel has loosely mounted on it a support for the driving pinion of the speedometer mechanism, whereby the said pinion is maintained in fixed or substantially fixed relation to the driving gear attached to the front wheel, and also to the rigid frame of the machine. These and other features of this invention will be pointed out in the claims at the end of this specification.

Figure 7:
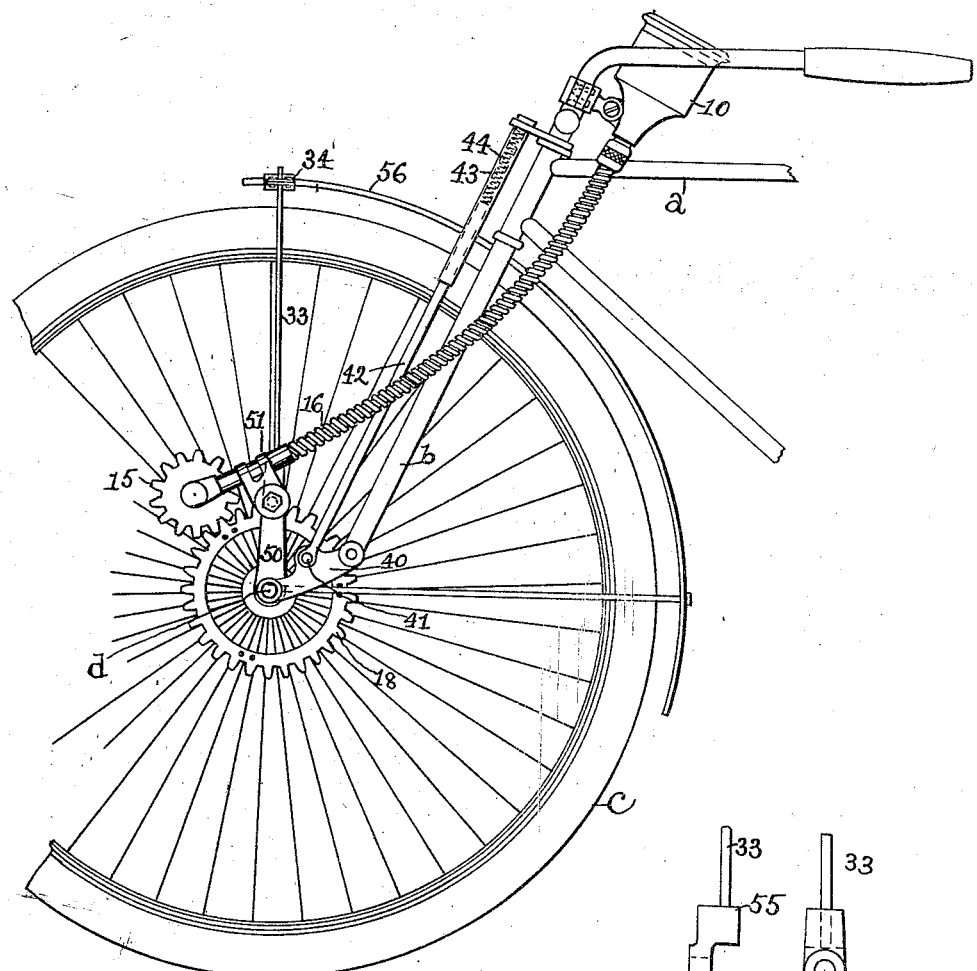
Figures 8, 9:
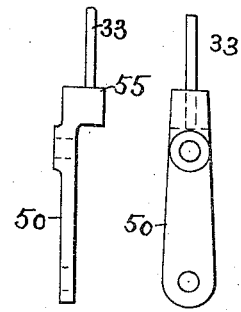

Figure 1 is a side elevation of a portion of a motor cycle provided with a speedometer attachment embodying this invention. Fig. 2, a detail in section on the line 2—2, Fig. 1, looking down; Figs. 3 and 4, details of the support for the flexible shaft shown in Fig. 1; Figs. 5 and 6, details to be referred to; Fig. 7, a modification to be referred to; Figs. 8 and 9, details of the modified form of support shown in Fig. 7.

In Fig. 1 is shown a portion of one construction of spring forked motor cycle of known make, which comprises the frame $a$, forks $b$, front wheel $c$ provided with the axle $d$, upon which is pivotally mounted at its opposite ends elbow levers $e$, only one of which is shown, to one arm of each of which is pivoted at $f$ one of the forks $b$ and to the other arm of which is pivoted an upright rod $g$, which is connected at its upper end to a spring $h$ attached to the frame $a$. The machine is provided with a speedometer 10 of any suitable or known construction, which is shown as secured to the handle bar 12 by a clip 13 and is operatively connected with a pinion 15 by an intermediate flexible shaft, not shown, but which is inclosed within a suitable hollow shaft 16. The pinion 15 may be designated the driving pinion for the mechanism of the speedometer and is itself driven by a gear 18 suitably secured to the front wheel $c$. The present invention has for its object to equip motor cycles of the class referred to with a speedometer, which will accurately indicate the speed and distance and be substantially uninfluenced by the vibration of the cycle or by movement of the spring forks. This result is accomplished as herein shown by providing a support for the hollow shaft 16 and the driving pinion 15, so that the latter has a fixed or substantially fixed relation at all times to the gear 18 and to the frame of the machine. The support referred to is shown in Figs. 1 to 4 as a lever 20 comprising a hub and arms 21, 22, which are offset with relation to said hub as shown in Fig. 4.

The lever 20 is loosely mounted on the axle $d$ of the front wheel, and as shown in Fig. 2, said lever is mounted on the hub 30 of a nut 31, which is screwed upon the end of the axle. The arm 21 of the lever has secured to it a clip 32, which supports the hollow shaft 16 and the pinion 15, and the arm 22 of said lever has secured to it a guide rod 33, which extends loosely through a guide 34 (see Figs. 5 and 6), which is secured to the rod $g$. The offset arm 22 enables the pinion 15 to be brought into mesh with the gear 18 attached to the front wheel $c$.

By reference to Fig. 1, it will be seen that the support or lever 20 is concentric with relation to the front wheel $c$ and the gear 18 attached thereto, and moves with the front wheel and is uninfluenced or substantially uninfluenced by the movement of the spring fork or the lever $e$ to which the latter is connected. As a result, the speedometer accurately indicates the speed of the motor cycle and also the distance traveled by the latter, inasmuch as the pinion 15 has a fixed or substantially fixed relation to the gear 18 and is uninfluenced by the oscillation of the lever e.

In Fig. 7, is shown a different construction of spring forked motor cycle, in which the forks are attached to a lever 40 pivoted at one end on the axle and having its opposite end pivotally connected with the forks b, while at an intermediate point 41 is pivoted the lower end 42 of a telescopic tube, which has its upper part 43 attached to the frame a of the machine and is yieldingly supported by a spring 44, which is located between the tubes 42, 43. This construction of motor cycle is of known make, and to provide the same with a speedometer 10, which is uninfluenced in its operation by the oscillation of the lever 40, an upright lever 50 (see Figs. 8 and 9) is loosely mounted on the axle d and has attached to it the clip 51, which supports the hollow shaft 16 and the pinion 15.

The lever 50 is provided at its upper end with an off-set portion 55 to which the guide rod 33 is attached, said rod being extended through the guide 34 attached, as shown, to the mud guard 56. In the construction and arrangement shown in Fig. 7, it will be observed that the pinion 15 is in fixed or substantially fixed relation to the gear 18, and consequently inaccuracies in the operation of the speedometer are avoided, inasmuch as the relation of the pinion 15 to the gear 18 is not influenced by the oscillation of the lever 40.

Claims.

1. In a motor cycle of the class described, in combination, a front wheel, a gear attached to the front wheel, a pinion in mesh with said gear, a speedometer carried by the cycle, means driven by said pinion operating said speedometer, a support for said pinion loosely mounted upon said axle independently of said gear, and means coöperating with said support to prevent oscillation of the said pinion with relation to said gear, substantially as described.

2. In a motor cycle of the class described, provided with a front wheel, a spring fork and with a support for said fork pivotally mounted on the axle of the front wheel, in combination with a speedometer carried by said cycle, a gear attached to the front wheel, a pinion meshing with said gear and operatively connected with said speedometer, and a support for said pinion separate from the support for the spring fork and independent of said gear and loosely mounted on the axle of said front wheel, substantially as described.

3. In a motor cycle of the class described, provided with a front wheel, a spring fork and with a support for said fork pivotally mounted on the axle of the front wheel, in combination with a speedometer carried by said cycle, a driving member attached to said front wheel, a driving mechanism for said speedometer actuated by said driving member, and a support for said mechanism loosely mounted on the axle of said front wheel and independent of the support for the spring fork and of said driving member and capable of maintaining a substantially fixed relation between said driving mechanism and said front wheel and preventing substantial oscillation of said pinion with relation to said gear, substantially as described.

4. In a motor cycle of the class described, provided with a front wheel, a spring fork and with a support for said fork pivotally mounted on the axle of the front wheel, in combination with a speedometer carried by said cycle, a driving mechanism for said speedometer including a pinion, a gear attached to said front wheel, and a lever independent of the support for said spring fork and loosely mounted on said axle, a guide rod connected with said lever, and a guide for said rod, substantially as described.

5. In a motor cycle of the class described, provided with a front wheel, a spring fork and an oscillating support therefor, a speedometer carried by said cycle, a driving member attached to said wheel, a driving mechanism for said speedometer actuated by the said driving member, a support for said driving mechanism loosely mounted on the axle of said front wheel and independent of said driving member, and means coöperating with said support for maintaining a substantially fixed relation between said driving mechanism and said front wheel and for preventing substantial oscillation of said pinion with relation to said gear, for the purpose specified.

In testimony whereof, I have signed my name to this specification in the presence of two subscribing witnesses.

ROLLIN ABELL.

Witnesses:
Jas. H. Churchill,
J. Murphy.